April 9, 1963 W. HENNING 3,084,379
METHOD OF SHELLING LONG-TAILED CRAYFISH AND THE LIKE
Filed Nov. 23, 1959 2 Sheets-Sheet 1
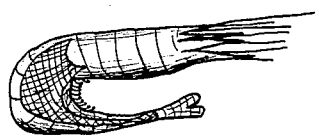
FIG. 1
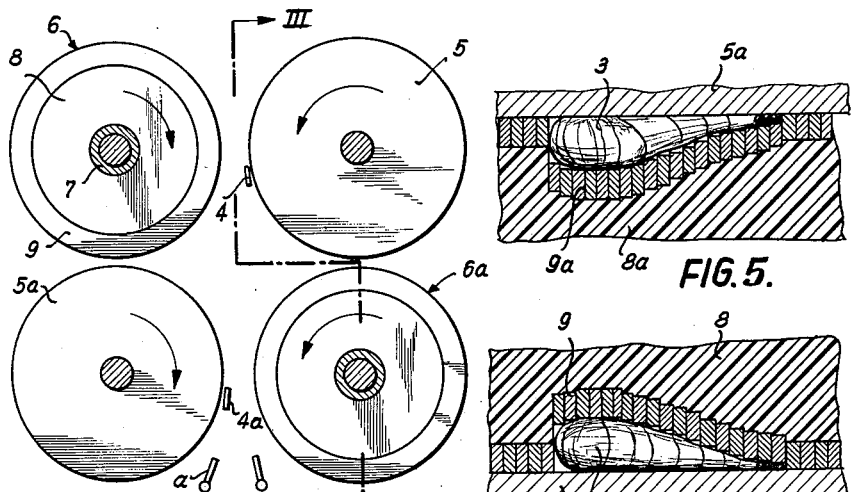
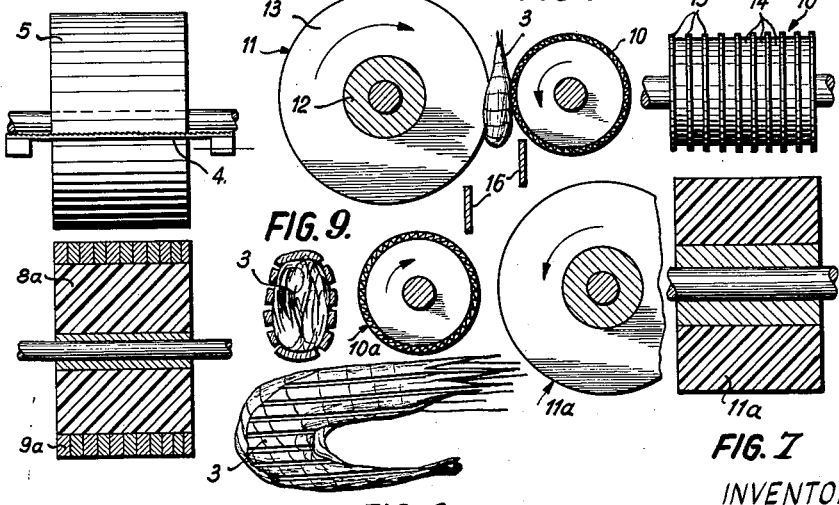
INVENTOR:
WOLFGANG HENNING
By
Richardson, David + Nerdon
Attys.

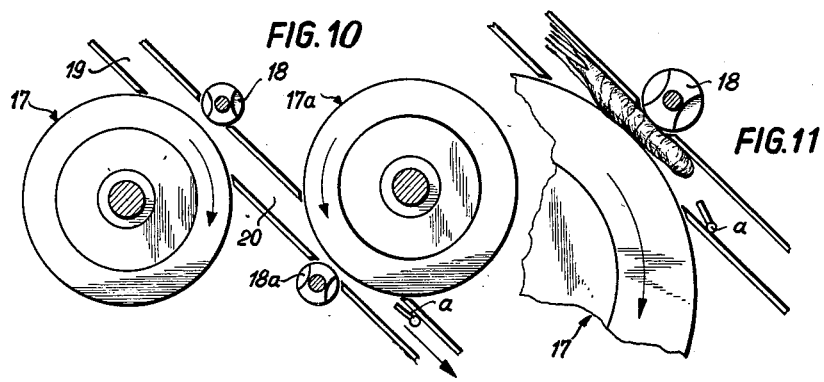

United States Patent Office 3,084,379
Patented Apr. 9, 1963

3,084,379
METHOD OF SHELLING LONG-TAILED
CRAYFISH AND THE LIKE
Wolfgang Henning, 88 Niendorfer Strasse, Hamburg-Niendorf, Germany
Filed Nov. 23, 1959, Ser. No. 854,795
3 Claims. (Cl. 17—45)

Shrimps, also called prawns are a type of crayfish whose flesh is very savoury. This crayfish occurs in bulk. A machine for removing the shell in order to obtain the flesh is not used in practice but the flesh of the boiled shrimps is obtained by home shelling. This crayfish is very small, weighing approximately from 3 to 4 grammes each, and therefore its shelling is very troublesome. The smaller of these shrimps cannot in general be shelled by hand because the cost of shelling would be too high. On the other hand however, the flesh of these small shrimps is very savoury.

A method was known and was also industrially applied, according to which the boiled shrimps were dried so that they lost approximately one third of their water contents. This caused the shell to become brittle and enabled it to be easily removed from the highly dried flesh and thereafter the flesh was again hydrated with water. It has been found that this method entailed a serious loss of quality owing to the long drying process and the subsequent soaking of the flesh, and therefore this method sufficed only in periods of emergency, for instance in time of war. According to the known method, the animals were dried and in fact the drying process had to last a few hours because the inner humidity can only get through the firmly closed shell very slowly. Owing to the length of this drying process the flesh lost too much cell water which was only replaced insufficiently and with a loss of quality by soaking in water.

In order to avoid the long drying periods according to the known method which produce flesh of poor quality and in order to arrive at an industrial shelling of the shrimps so as to avoid shelling by hand which is not always free from objection from the point of view of hygiene, a method for shelling long tailed crayfish, in particular shrimps, is proposed according to the invention which consists in that in order to prepare for drying, with subsequent stripping off of the shells from the flesh by pulling away, sieving, grating or the like, or in order to prepare for the stripping off of the shell by means of a water jet, compressed air or the like, the shell of the boiled shrimps is partly cut away, severed, torn open or perforated. This preparation according to the invention is essential for the industrial shelling of shrimps. By means of the said preparation the water of the shell, which is not cell-bound, is very rapidly removed in the subsequent drying, so that the parts of the shell which have been severed or broken through, or the parts of shell which still adhere after cutting away shell parts, very rapidly become brittle without any substantial amount of the cell water in the flesh being lost, so that in general it is only necessary after the very short period of drying to effect a simple sieving of the shells.

Hitherto the drying was effected at temperatures which were not too high because, on account of the long drying periods which were hitherto necessary, high temperatures would have led to burning and consequent unfavourable influence on the flavour. In order to reduce the drying time of the shrimps prepared according to the invention even more than is possible by reason of the preparation above, it is proposed as a further development of the invention that the drying which follows the preparation is effected by the application of alternating high temperatures and low temperatures, for example ambient temperatures by employing hot air and cold air or the like and higher speeds of flow so that it is possible to use temperatures up to approximately 200° C. without detrimental effects on the flesh of the shrimps. This drying with varying temperatures renders the shell of the shrimps, in particular of the prepared shrimps, but also of smaller shrimps which are not prepared, very rapidly brittle and loosens the shell parts from the flesh body so that subsequently it only remains in practice, to effect a sieving of the shell parts; however, it is also possible in this case to clean or grate the shrimp shell away and to sieve the shell parts.

It is advantageous according to the nature of the process to effect the preparation of the boiled shrimps for the subsequent drying and removing of the shells in such a manner that as large as possible a surface of the shell is affected and in particular also that the tail part is affected since, as is known, the tail muscle adheres particularly strongly in the tail part of the shell. For this purpose it is particularly advantageous according to the invention that one side or successively both sides of the shrimps are aligned as a plane and that the plane shell part is cut away, is notched, is torn open or is perforated on this plane side, or successively on both sides, by means of knives, saws, disc type milling cutters, sharp pointed rollers or the like. By this plane alignment of one side surface or of both side surfaces successively it becomes possible to cut away the shell on this side or these sides from the head up to the tail fin by means of knives or saws or to cut the shell in strips by means of saw discs or disc type milling cutters or to perforate the shell so that by this means the subsequent drying of the shell in order to grate off or sieve the shell parts including the tail parts can be effected very rapidly.

The machine or device necessary for carrying out the method in order to prepare the shrimps is of very simple construction. It consists essentially of a pair of rollers only, one roller thereof being a feeling roller working in a radial direction which brings one side of the shrimp from the head up to the tail fin against the second roller so that a preparation of the shrimp shell is thereby effected by using knives, saws, disc type milling cutters, pin-pointed disc or the like as will be later explained in more detail. Owing to the use of a feeling roller it is not at all necessary to effect an adjustment of the device for different sizes of thicknesses of shrimps.

Experiments have shown that for the removal of shell part remainders it is even possible to succeed in some cases on the basis of the preparation according to the invention without carrying out the drying processes in such cases when during the preparation the tail roots and the head become detached on both sides from the flesh. The remaining parts of the shell can then be rinsed or blown off by means of a flow of water under pressure, a flow of compressed air, or a compressed flow from a water air-mixture, the flesh being washed at the same time. The separation of flesh and shell parts can then be effected by air separation. A light drying, which in that case only dries the thin shell parts but not the flesh, has proved to be advantageous to the separation processes. In this connection practically no cell water of the flesh is dried so that the advantage as compared to the known method is still greater.

The invention will be described with reference to the accompanying drawings which show various embodiments. In the drawings:

FIG. 1 illustrates a shrimp.

FIG. 2 is a side view of one embodiment of the invention.

FIG. 3 is a section on the line III—III of FIG. 2.

FIGS. 4 and 5 are explanatory views.

FIGS. 6 to 9 describe another embodiment of the device.

FIGS. 10 and 11 show another embodiment.

The shrimp which is to be shelled takes after boiling the form shown in a side view in FIG. 1, wherein the two tail fins are juxtaposed in the longitudinal median plane of the shrimp and the flesh body is shown crosshatched. These shrimps are conveyed from above to parallel horizontal pairs of rollers 5, 6 and 5a, 6a according to FIGURE 2 for the preparation for the subsequent drying.

The removal of the shell at the tail end is particularly important since the tail muscle adheres very firmly to the shell. Therefore in order to be able to remove the shell also at the tail end the device for preparing the shrimps consists according to FIGURES 2 and 3 of a roller 5 having a smooth periphery and of a roller 6 which is a feeler roller. This feeler roller 6 consists of a solid core 7 around which is disposed a flexible sleeve 8 advantageously made of foam rubber or plastic material and on this cushion sleeve 8, which is radially flexible, are mounted, with prestressing of the cushion 8, a row of thin annular discs 9 disposed next to one another. Tangentially to the plain roll 5 is disposed a blade 4 which as is indicated in FIGURE 3 can effect a reciprocating movement or which is an endless saw band which is straightened along the length of the roller 5. Here also an endless knife band can again be used. If the shrimps are supplied from above between the rollers 5 and 6 then the shrimps 3 will be pressed by the radially flexible mounted ring discs 9 with one side surface against the periphery of the plain roller 5 according to the partial horizontal section of FIGURE 4 so that the one side surface has a plane alignment. Through this plane alignment the saw blade 4 cuts away the shell surface in plane alignment on the side of the plain roller 5 from the head to the tail fin. In order also to remove the other side surface of the shrimp from the shell, there is provided a second pair of rollers 5a and 6a which are disposed below and in interchanged positions with respect to the rollers 5 and 6. Further, guide members may be provided between these two roller pairs by means of which the shrimps falling downwards to the second pair of rollers 5a, 6a are prevented from being laterally turned round. Then by means of the feeler roller 6a the other side surface of the shrimp is pressed against the plain roller 5a according to the partial section of FIGURE 5 and the lateral shell surface which has a plane alignment is cut away by means of a second blade 4a. By this means the shrimp is freed from the shell on both side surfaces from the head to the tail fin so that the drying can be effected and followed by sieving of the remaining parts of the shell.

The flesh of the shrimps is exposed on the sides so that subsequently the shrimps 3 need only be subjected to a short drying process in order to effect subsequently a sieving or blowing off of the remaining parts of the shell from the flesh. In this connection it should be noted that the drying is advantageously effected with alternating high and low temperatures whereupon the brittle shell is grated off, sieved or blown off. The high temperatures of the air stream can amount to approximately 200° C. while the low temperature may correspond to the atmospheric temperature. By means of this alternating treatment with high and low temperatures burning of the flesh of the shrimps is avoided and at the same time drying of the shell parts is obtained in a few minutes. During this short drying period the flesh loses only very little water since the water of the flesh is cell-bound while the shell parts do not contain any essential part of the humidity in a closed cell binding.

The previously mentioned drying process can also be effected subsequently to the preparation of the shrimps in the case of all the devices to be explained hereunder, and can in certain circumstances be effected without preparation if small and very small shrimps are to be shelled in which the shell does not adhere so firmly to the flesh and contains less water than in the case of the larger shrimps.

Since in this preparation the tail roots and the head are also separated from the flesh, it has been shown by experiments that it is also possible to succeed in removing the remaining shell parts without a drying process. The remaining parts of the shells can in fact be rinsed away or blown by a flow of pressure water, a flow of compressed air or by a pressure flow of a water-air mixture. For this purpose a nozzle or a nozzle system is advantageously arranged directly behind the last pair of rollers and said nozzle or nozzle system is fed with water, air or a water air-mixture under pressure. Thereby the flesh of the shrimps is washed at the same time. For separating flesh and shell parts it is possible in a known manner to effect an air separation or the like and in this, a light drying in which only the thin shell parts and no flesh is dried has proved advantageous. The shelling of the shrimps would be further speeded up and the shelling installation would be cheaper by means of this arrangement.

Instead of the feeler rollers 6 and 6a provided with the flexibly mounted annular discs 9, 9a feeler rollers corresponding to those of FIGURE 6 may be used. These feeler rollers consist of a solid core which is provided with a foam covering. The shrimps which pass through the rollers then become pressed in the foam material which, on account of its flexibility, applies the opposite side surface of the shrimp flat against the plain roller 5 or 5a.

According to the specific embodiment of FIGURES 6 to 9 another construction of two rollers 10 and 11 is used for the preparation of the shrimps 3. The roller 11 is a feeler roller of the type mentioned previously in which a covering 13 of elastic foam material consisting of rubber or plastic material is mounted on a solid core 12. The roller 10, which advantageously has a somewhat smaller diameter than the roller 11, consists of discs 14 having a smooth periphery and alternating with discs 15, of which the peripheries are somewhat larger than the peripheries of the discs 14 and are provided with saw teeth or milling teeth. The saw teeth or milling teeth project beyond the smooth discs by a distance which corresponds approximately to the thickness of the shell of the shrimps. The shrimps 3 are conveyed between the rollers 10 and 11, the roller 10 rotating at a greater speed than the roller 11, so that one side of the shrimps is pressed flatly by the feeler roller 11 against the more rapidly rotating roller 10 by means of which the shells of the shrimps are separated into strips by the saw discs and milling discs 15 as shown in FIGURES 8 and 9. The shrimps thus prepared on one side, now fall between a lower second pair of rollers 10a, 11a which are interchanged in their positions relative to the rollers 10, 11. Guide members 16 may be provided between the two pairs of rollers 10, 11 and 10a, 11a by means of which the shrimps falling down from the one pair of rollers to the other pair of rollers are prevented from having their sides changed. When the shrimps have also passed through the second pair of rollers 10a, 11a they are prepared on both sides, by cutting the shell in strips, for the subsequent drying.

Similarly as in the case of the example of FIGURES 6 to 9 it is possible to proceed according to the example of FIGURES 10 and 11 wherein again two pairs of rollers 17, 18, 17a, 18a arranged behind one another are provided. The rollers 17 and 17a are feeler rollers as described with reference to FIGURES 3 and 4 or FIGURES 6 and 7 while the rollers 18 and 18a are milling rollers by means of which the particular side surface of the shrimp which is pressed against a milling roller by the associated feeling roller is freed from the shell by the fact the shell is cut away. The shrimp is conveyed through a channel 19 to the first pair of rollers 17, 18 and glides on further guide members 20 to the second pair of rollers 17a, 18a so that an exchange of sides of the passing shrimp does not occur and both side surfaces are freed from the shell. Since the flesh is also in this case completely separated on both sides from the head and the tail it is also possible in this case to rinse or blow off immediately the remaining shell parts, without any drying, by means of a flow of pressure water, a flow of compressed air or a pressure flow consisting of a mixture of water and air, to which purpose nozzles *a* are arranged in the guiding channel 19 or 20 behind the last pair of rollers 17a, 18a.

What I claim is:

1. A method of deshelling freshly boiled, long-tailed crayfish, in particular shrimps, comprising the following steps: moving said shrimps in their charactreistic bent-up shape with one side aligned in a first plane in which a first deshelling tool is arranged, thereby opening the shell on one side from head to tail, further moving said one-sidedly opened shrimps with their other side aligned in a second plane in which a second deshelling tool is arranged, thereby opening the shell on the other side from head to tail, subjecting said shrimps to a rapid drying process thereby drying said shell only without detrimental effect on the meat, and finally separating said shells and said meat by streams of pressurized fluid.

2. A method of deshelling freshly boiled, long-tailed crayfish, in particular shrimps, comprising the following steps: moving said shrimps in their characteristic bent-up shape with one side aligned in a first plane in which a first deshelling tool is arranged, thereby opening the shell on one side from head to tail, further moving said one-sidedly opened shrimps with their other side aligned in a second plane in which a second deshelling tool is arranged, thereby opening the shell on the other side from head to tail, subjecting said shrimps to a rapid drying process thereby drying said shell only without detrimental effect on the meat and finally separating said shells and said meat by means of sieving.

3. A method of deshelling freshly boiled, long-tailed crayfish, in particular shrimps, comprising the following steps: moving said shrimps in their characteristic bent-up shape with one side aligned in a first plane in which a first deshelling tool is arranged, thereby opening the shell on one side from head to tail, further moving said one-sidedly opened shrimps with their other side aligned in a second plane in which a second deshelling tool is arranged, thereby opening the shell on the other side from head to tail, subjecting said shrimps alternately to streams of hot air having a temperature up to 200° C. and cold air having ambient temperature, thereby rapidly drying said shells only without detrimental effect on the meat, whereupon said dried shells are separated from said meat.

References Cited in the file of this patent

UNITED STATES PATENTS

| | | |
|---|---|---|
| 2,784,450 | Jonsson | Mar. 12, 1957 |
| 2,816,319 | Martinez | Dec. 17, 1957 |
| 2,850,761 | Jonsson | Sept. 9, 1958 |
| 2,879,538 | Peuss | Mar. 31, 1959 |
| 2,978,334 | Lapeyre | Apr. 4, 1961 |